US012159101B1

(12) United States Patent
Petrescu et al.

(10) Patent No.: US 12,159,101 B1
(45) Date of Patent: Dec. 3, 2024

(54) SYSTEMS AND METHODS FOR OPTIMIZING ROBOTIC FORM-FILLING ACTIVITIES

(71) Applicant: UiPath Inc., New York, NY (US)

(72) Inventors: Alexandru C. Petrescu, Buchare (RO); Cosmin V. Voicu, Buchare (RO); Razvan Marinovici, Buchare (RO); Ion Miron, Buchare (RO)

(73) Assignee: UiPath Inc., New York, NY (US)

(*) Notice: Subject to any disclaimer, the term of this patent is extended or adjusted under 35 U.S.C. 154(b) by 7 days.

(21) Appl. No.: 18/347,819

(22) Filed: Jul. 21, 2023

(51) Int. Cl.
*G06F 40/174* (2020.01)
*G06F 16/958* (2019.01)

(52) U.S. Cl.
CPC .......... *G06F 40/174* (2020.01); *G06F 16/958* (2019.01)

(58) Field of Classification Search
CPC ............... G06F 40/174; G06F 16/958
See application file for complete search history.

(56) References Cited

U.S. PATENT DOCUMENTS

| | | | |
|---|---|---|---|
| 6,199,079 B1 | 3/2001 | Gupta | |
| 6,651,217 B1 | 11/2003 | Kennedy | |
| 7,500,178 B1 | 3/2009 | O'Donnell | |
| 10,839,404 B2 | 11/2020 | Ramamurthy | |
| 11,372,650 B2 | 6/2022 | Perera | |
| 11,504,852 B2 | 11/2022 | Geffen | |
| 2008/0313529 A1 | 12/2008 | Gwozdz | |
| 2019/0129824 A1 | 5/2019 | Radhakrishnan | |
| 2022/0032457 A1 | 2/2022 | Anand | |
| 2022/0044168 A1 | 2/2022 | Oberman | |
| 2022/0072704 A1 | 3/2022 | Nott | |
| 2023/0138159 A1* | 5/2023 | Nahum | G06F 3/0483 715/753 |
| 2024/0143358 A1* | 5/2024 | Lepe | G06F 11/07 |

FOREIGN PATENT DOCUMENTS

| | | |
|---|---|---|
| CN | 114626351 A | 6/2022 |
| EP | 3206170 A | 8/2017 |
| WO | 2017001560 A | 1/2017 |

OTHER PUBLICATIONS

Jimenez-Ramirez et al., "Automated testing in robotic process automation projects," J. Softw. Evol. Proc., https://doi.org/10.1002/smr.2259, Mar. 17, 2020.
Leno et al., "Robotic Process Mining: Vision and Challenges," Business & Information Systems Engineering 63:301-314, Mar. 24, 2020.
Voicu et al., U.S. Appl. No. 18/347,153, filed Jul. 5, 2023.

* cited by examiner

*Primary Examiner* — Phuong H Nguyen
(74) *Attorney, Agent, or Firm* — Law Office of Andrei D Popvici, PC

(57) ABSTRACT

Some embodiments improve the autonomy of a form-filling RPA robot by supplying it with a strategy ranking indicator identifying multiple alternative strategies for filling in a target form field, so that when one strategy fails, the RPA robot may fall back on an alternative strategy. The ranking indicator further ranks the respective form-filling strategies, enabling the RPA robot to choose among the available strategies according to their rank. Some embodiments prioritize higher-ranking strategies. The strategy ranking indicator is dynamically updated to promote successful form-filling strategies and/or demote failing ones, and is made available to other instances of the RPA robot.

21 Claims, 8 Drawing Sheets

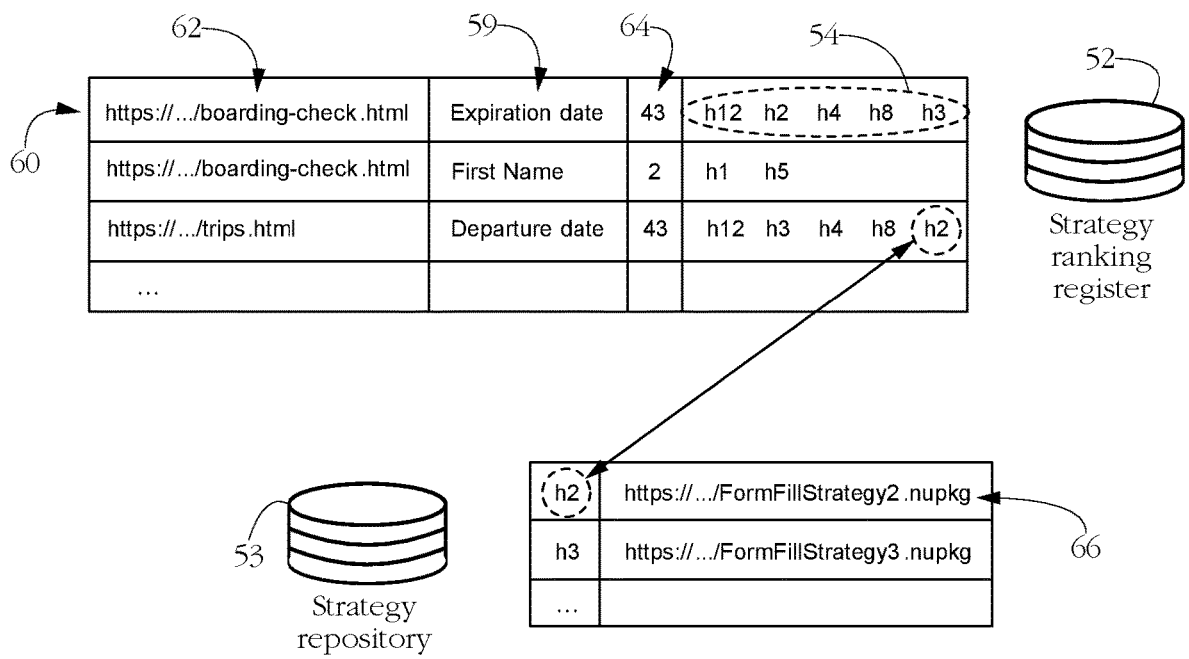
FIG. 7-A
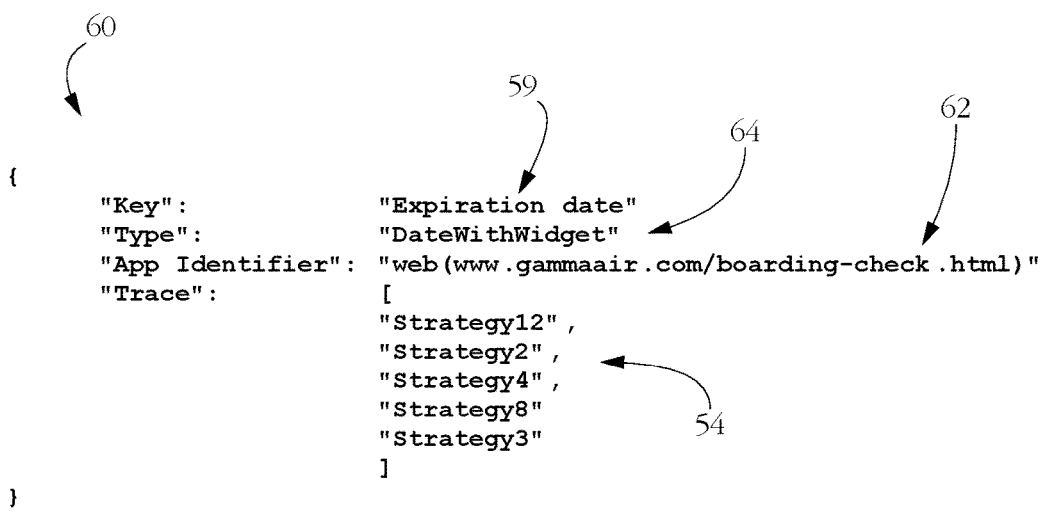
FIG 7-B

SYSTEMS AND METHODS FOR OPTIMIZING ROBOTIC FORM-FILLING ACTIVITIES

BACKGROUND OF THE INVENTION

The invention relates to robotic process automation (RPA), and in particular to facilitating the development and use of RPA software.

RPA is an emerging field of information technology aimed at improving productivity by automating repetitive office computing tasks, thus freeing human operators to perform more intellectually sophisticated and/or creative activities. Notable tasks targeted for automation include extracting structured data from documents and interacting with user interfaces, for instance filling forms, among others.

However, automating even apparently simple software tasks such as form filling may comprise substantial technical challenges. Depending on the target application, the types and behaviors of forms fields may be extremely diverse, from simple click-and-type to sophisticated structured input involving multiple cascading forms, calendars, calculators, etc. Therefore, to design a successful form-filling robot, the RPA developer typically has to know a priori what type of form fields the respective robot will encounter and to specifically instruct the robot on how to respond to each situation. RPA developers may further need a deep knowledge of the software targeted for automation, such as web browsers and associated technologies, spreadsheet applications, customer relationship management software (e.g., Salesforce® Platform from Salesforce, Inc.), enterprise resource planning software (e.g., SAP®), etc.

Furthermore, since the software targeted for automation is typically developed and maintained independently of the robot, the look, structure, and/or functionality of the target forms may change at any time. Conventional RPA robots have only limited adaptability, so such changes usually cause the respective automations to fail, bringing about maintenance costs and productivity losses.

In view of the above, there is a strong interest in developing robust RPA robots capable of efficiently fill out a broad variety of forms, while being flexible enough to respond to unexpected situations. Concurrently, there is a strong interest in making both the design side and runtime aspects of RPA more user-friendly and intuitive, to extend the reach of RPA technology to 'citizen developers', i.e., users that lack advanced programming skills or specialized training.

SUMMARY OF THE INVENTION

According to one aspect, a method optimizes robotic procedures for filling in a target form field displayed by a target user interface (UI). The method comprises employing at least one hardware processor of a computer system to retrieve a strategy ranking indicator from a database according to an identifier of the target UI, wherein the strategy ranking indicator identifies a plurality of alternative robotic process automation (RPA) strategies for filling in the target form field and further indicates a ranking among the plurality of alternative RPA strategies. Each of the plurality of alternative RPA strategies comprises a distinct sequence of RPA activities configured to fill in the target form field. The method further comprises employing the at least one hardware processor to, in response to selecting a first RPA strategy from the plurality of alternative RPA strategies according to the ranking, perform a first attempt to fill in the selected form field according to the first RPA strategy. The method further comprises employing the at least one hardware processor to, in response to determining that the first attempt failed, select a second RPA strategy from the plurality of alternative RPA strategies according to the ranking and to perform a second attempt to fill in the selected form field according to the second RPA strategy. The method further comprises employing the at least one hardware processor to, in response to determining that the second attempt was successful, cause an update of the strategy ranking indicator within the database, the update configured to change the ranking so that a selection of the second RPA strategy is prioritized over a selection of the first RPA strategy.

According to another aspect, a computer system comprises at least one hardware processor configured to optimize robotic procedures of filling in a target form field displayed by a target UI. The at least one hardware processor is configured to retrieve a strategy ranking indicator from a database according to an identifier of the target UI, wherein the strategy ranking indicator identifies a plurality of alternative RPA strategies for filling in the target form field and further indicates a ranking among the plurality of alternative RPA strategies. Each of the plurality of alternative RPA strategies comprises a distinct sequence of RPA activities configured to fill in the target form field. The at least one hardware processor is further configured to, in response to selecting a first RPA strategy from the plurality of alternative RPA strategies according to the ranking, perform a first attempt to fill in the selected form field according to the first RPA strategy. The at least one hardware processor is further configured to, in response to determining that the first attempt failed, select a second RPA strategy from the plurality of alternative RPA strategies according to the ranking and to perform a second attempt to fill in the selected form field according to the second RPA strategy. The at least one hardware processor is further configured to, in response to determining that the second attempt was successful, cause an update of the strategy ranking indicator within the database, the update configured to change the ranking so that a selection of the second RPA strategy is prioritized over a selection of the first RPA strategy.

According to another aspect, a non-transitory computer-readable medium stores instructions which, when executed by at least one hardware processor of a computer system, cause the computer system to optimize robotic procedures for filling in a target form field displayed by a target UI. The instructions cause the computer system to retrieve a strategy ranking indicator from a database according to an identifier of the target UI, wherein the strategy ranking indicator identifies a plurality of alternative RPA strategies for filling in the target form field and further indicates a ranking among the plurality of alternative RPA strategies. Each of the plurality of alternative RPA strategies comprises a distinct sequence of RPA activities configured to fill in the target form field. The instructions further cause the computer system to, in response to selecting a first RPA strategy from the plurality of alternative RPA strategies according to the ranking, perform a first attempt to fill in the selected form field according to the first RPA strategy. The instructions further cause the computer system to, in response to determining that the first attempt failed, select a second RPA strategy from the plurality of alternative RPA strategies according to the ranking and to perform a second attempt to fill in the selected form field according to the second RPA strategy. The instructions further cause the computer system to, in response to determining that the second attempt was successful, cause an update of the strategy ranking indicator within the database, the update configured to change the ranking so that a selection of the second RPA strategy is prioritized over a selection of the first RPA strategy.

BRIEF DESCRIPTION OF DRAWINGS

The foregoing aspects and advantages of the present invention will become better understood upon reading the following detailed description and upon reference to the drawings where:

FIG. 7-A shows an exemplary strategy ranking record according to some embodiments of the present invention.

FIG. 7-B shows another exemplary strategy ranking record according to some embodiments of the present invention.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A fillable form displayed by a user interface as described herein may comprise multiple fields, each field being an individual, distinct receptacle for user input. The terms "form field" and "input field" are herein used interchangeably. The term "database" is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
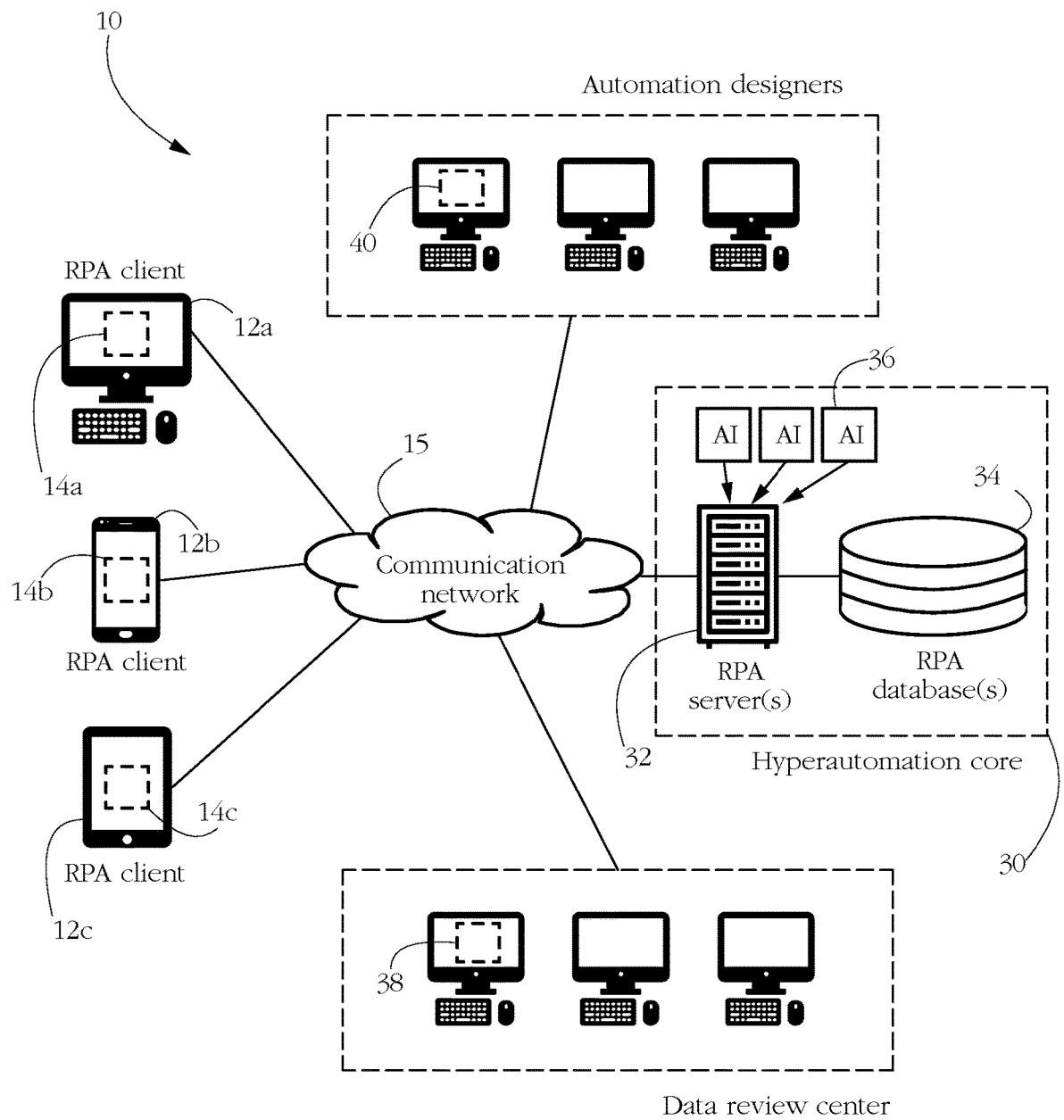
FIG. 1 shows an architectural diagram of a hyper-automation system according to some embodiments of the present invention.

FIG. 1 is an architectural diagram illustrating a hyper-automation system 10 according to some embodiments of the present invention. 'Hyper-automation' as used herein refers to extended automation systems that bring together components of robotic process automation (RPA), integration tools, and technologies that amplify the ability to automate work. RPA herein denotes automatically carrying out a computing task by mimicking a sequence of actions of a human operator using a set of software tools to perform the respective task. In an exemplary scenario, a company employee uses business software to issue invoices to clients, which may involve a sequence of actions such as opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. An RPA robot may effectively reproduce the same sequence of actions, therefore automating the respective invoicing task. Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface (GUI) may comprise having the operating system move the mouse pointer to the respective button and generating a mouse click event, or may alternatively comprise toggling the respective GUI button itself to a clicked state.

Exemplary processes targeted by RPA include processing of payments, invoicing, communicating with business clients (e.g., distribution of newsletters and/or product offerings), internal communication (e.g., memos, scheduling of meetings and/or tasks), auditing, and payroll processing, among others.

RPA may constitute the core of hyper-automation system 10, and in certain embodiments, automation capabilities may be expanded with artificial intelligence (AI)/machine learning (ML), process mining, analytics, and/or other advanced tools. As hyper-automation system 10 learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, optimize, and scale automations.

Exemplary hyper-automation system 10 includes RPA client computing systems 12a-c, such as a desktop computer, tablet computer, and smart phone, among others. Any desired client computing system may be used without deviating from the scope of the invention including, but not limited to, smart watches, laptop computers, servers, Internet-of-Things (IoT) devices, etc. Also, while FIG. 1 shows only three client computing systems 12a-c, any suitable number of client computing systems may be used without deviating from the scope of the invention. For instance, in some embodiments, dozens, hundreds, thousands, or millions of client computing systems may be used. Client computing systems 12a-c may be actively used by a user or run automatically without much or any user input.

Each illustrated client computing system 12a-c has respective automation module(s) 14a-c running thereon. Exemplary automation module(s) 14a-c may include, but are not limited to, RPA robots, parts of an operating system, downloadable application(s) for the respective computing system, any other suitable software and/or hardware, or any combination of these without deviating from the scope of the invention.

In some embodiments, one or more of module(s) 14a-c may be listeners. Listeners monitor and record data pertaining to user interactions with respective computing systems and/or operations of unattended computing systems and send the data to a hyper-automation core system 30 via a communication network 15 (e.g., a local area network-LAN, a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from such listener processes may be sent periodically as part of a heartbeat message, or in response to a fulfillment of a data accumulation condition. One or more RPA servers 32 receive and store data from the listeners in a database, such as RPA database(s) 34 in FIG. 1.

Other exemplary automation module(s) 14a-c may execute the logic that actually implements the automation of a selected process. Stated otherwise, at least one automation module 14a-c may comprise a part of an RPA robot as further described below. Robots may be attended (i.e., requiring human intervention) or unattended. In some embodiments, multiple modules 14a-c or computing systems may participate in executing the logic of an automation. Some automations may orchestrate multiple modules 14a-c, may carry out various background processes and/or may perform Application Programming Interface (API) calls. Some robotic activities may cause a module 14a-c to wait for a selected task to be completed (possibly by another entity or automation module) before resuming the current workflow.

In some embodiments, hyper-automation core system 30 may run a conductor application on one or more servers, such as RPA server(s) 32. While FIG. 1 shows only one RPA server 32, multiple or many servers that are proximate to one another or in a distributed architecture may be employed without deviating from the scope of the invention. For instance, one or more of RPA server(s) 32 may be provided for conductor functionality, AI/ML model serving, authentication, governance, and or any other suitable functionality without deviating from the scope of the invention. In some embodiments, hyper-automation core system 30 may incorporate or be part of a public cloud architecture, a private cloud architecture, a hybrid cloud architecture, etc. In certain embodiments, hyper-automation core system 30 may host multiple software-based servers on one or more computing systems, such as RPA server(s) 32. In some embodiments, one or more servers of core hyper-automation system 30, such as RPA server(s) 32, may be implemented via one or more virtual machines (VMs).

In some embodiments, one or more of automation modules 14a-c may call one or more AI/ML models 36 deployed on or accessible by hyper-automation core 30. AI/ML models 36 may be trained for any suitable purpose without deviating from the scope of the invention. Two or more of AI/ML models 36 may be chained in some embodiments (e.g., in series, in parallel, or a combination thereof) such that they collectively provide collaborative output(s). Exemplary AI/ML models 36 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models 36 may be used without deviating from the scope of the invention. Using multiple AI/ML models 36 may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models 36 are deployed locally on at least one of RPA client computing systems 12a-c.

Hyper-automation system 10 may provide at least four main groups of functionality: (1) discovery; (2) building automations; (3) management; and (4) engagement. The discovery functionality may discover and provide automatic recommendations for different opportunities of automations of business processes. Such functionality may be implemented by one or more servers, such as RPA server 32. The discovery functionality may include providing an automation hub, process mining, task mining, and/or task capture in some embodiments.

The automation hub (e.g., UiPath Automation Hub™) may provide a mechanism for managing automation rollout with visibility and control. Automation ideas may be crowd-sourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from RPA clients 12a-c by listeners, for example, and processed by RPA server(s) 32. One or more AI/ML models 36 may be employed for this purpose. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for case of automation and potential savings (e.g., time and/or cost savings). One or more AI/ML models 36 may be employed to uncover recurring task patterns in the data. Repetitive tasks that are ripe for automation may then be identified. This information may initially be provided by listener modules (e.g., automation modules 14a-c) and analyzed on servers of hyper-automation core 30. The findings from task mining process may be exported to process documents or to an RPA design application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to an RPA design application, such as UiPath Studio™. Task capture may simplify the requirements gathering process for both subject matter experts explaining a process and Center of Excellence (CoE) members providing production-grade automations.

The automation-building functionality of hyper-automation system 10 may be accomplished via a computer program, illustrated as an RPA design application 40 in FIG. 1. Examples include UiPath Studio™, UiPath StudioX™, or UiPath Web™, among others. Such computer programs may be used to build and test automations for various applications and environments, such as web, mobile, SAP®, and virtualized desktops. In some embodiments, RPA design application 40 enables a human developer to design a workflow that effectively automates a target work process. A workflow typically comprises a sequence of custom automation steps, herein deemed RPA activities. Each activity includes at least one action performed by the robot, such as clicking a button, reading a file, writing to a spreadsheet cell, etc. Activities may be nested and/or embedded. In some embodiments, RPA design application 40 exposes a design interface and set of tools that give the developer control of the execution order and the relationship between activities of a workflow. In some embodiments, predefined activities, drag-and-drop modeling, and a workflow recorder may make automation easier with minimal coding. Document understanding functionality may be provided by AI activities for data extraction and interpretation that call one or more AI/ML models 36. Such automations may process virtually any document type and format, including tables, webpages, forms, signatures, and handwriting.

RPA design application 40 may also be used to seamlessly combine user interface (UI) automation with API automation, for example to provide API integration with various other applications, technologies, and platforms. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 10 may provide user interfaces, development environments, API integration, pre-built and/or custom-built AI/ML models, development templates, integrated development environments (IDEs), and advanced AI capabilities. Hyper-automation system 10 may further enable deployment, management, configuration, monitoring, debugging, and maintenance of RPA robots for carrying out the automations designed using application 40.

The management functionality of hyper-automation system 10 may provide deployment, orchestration, test management, AI functionality, and optimization of automations across an organization. One example of management functionality comprises the optimization of form-filling strategies and maintaining a centralized form-filling strategy knowledgebase as described herein. Other exemplary management functionality includes DevOps activities such as continuous integration and continuous deployment of automations. Management functionality may also act as an integration point with third-party solutions and applications for automation applications and/or RPA robots.

As an example of management functionality, a conductor application or service may facilitate provisioning, deployment, configuration, queuing, monitoring, logging, and interconnectivity of RPA robots, among others. Examples of such conductor applications/services include UiPath Orchestrator™ (which may be provided as part of the UiPath Automation Cloud™ or on premises, inside a virtual machine, or as a cloud-native single container suite via UiPath Automation Suite™). A test suite of applications/services (e.g., UiPath Test Suite™) may further provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

AI management functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models 36 from the AI center. Performance of the AI/ML models may be monitored. Models 36 may be trained and improved using human-validated data, such as that provided by a data review center as illustrated in FIG. 1. Human reviewers may provide labeled data (e.g., a training corpus) to hyper-automation core 30 via a review application 38 executing on a computer connected to network 15. Reviewers may also use application 38 to validate that predictions by AI/ML models 36 are accurate, and provide corrections otherwise. This dynamic input may then be saved as training data for retraining AI/ML models 36, and may be stored in a database such as RPA database 34, for example. The AI center may schedule and execute training jobs to train the new versions of AI/ML models 36 using the training data.

The engagement functionality of hyper-automation system 10 engages humans and automations as one team for seamless collaboration on desired processes. Low-code applications may be built (e.g., via UiPath Apps™) to connect to browser and legacy software. Applications may be created quickly using a web browser through a rich library of drag-and-drop controls, for instance. An application can be connected to a single automation or multiple automations. An action center (e.g., UiPath Action Center™) may provide a mechanism to hand off processes from robots to humans, and vice versa. Humans may provide approvals or escalations, make exceptions, etc. RPA robots may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations/workflows approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

In another exemplary engagement functionality, Chatbots (e.g., UiPath Chatbots™), social messaging applications, and/or voice commands may enable users to run automations. This may simplify access to information, tools, and resources users need to interact with customers or perform other activities. For instance, a chatbot may respond to a command formulated in a natural language by triggering a robot configured to perform operations such as checking an order status, posting data to a customer relations management (CRM) platform, etc.

In some embodiments, some functionality of hyper-automation system 10 may be provided iteratively and/or recursively. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
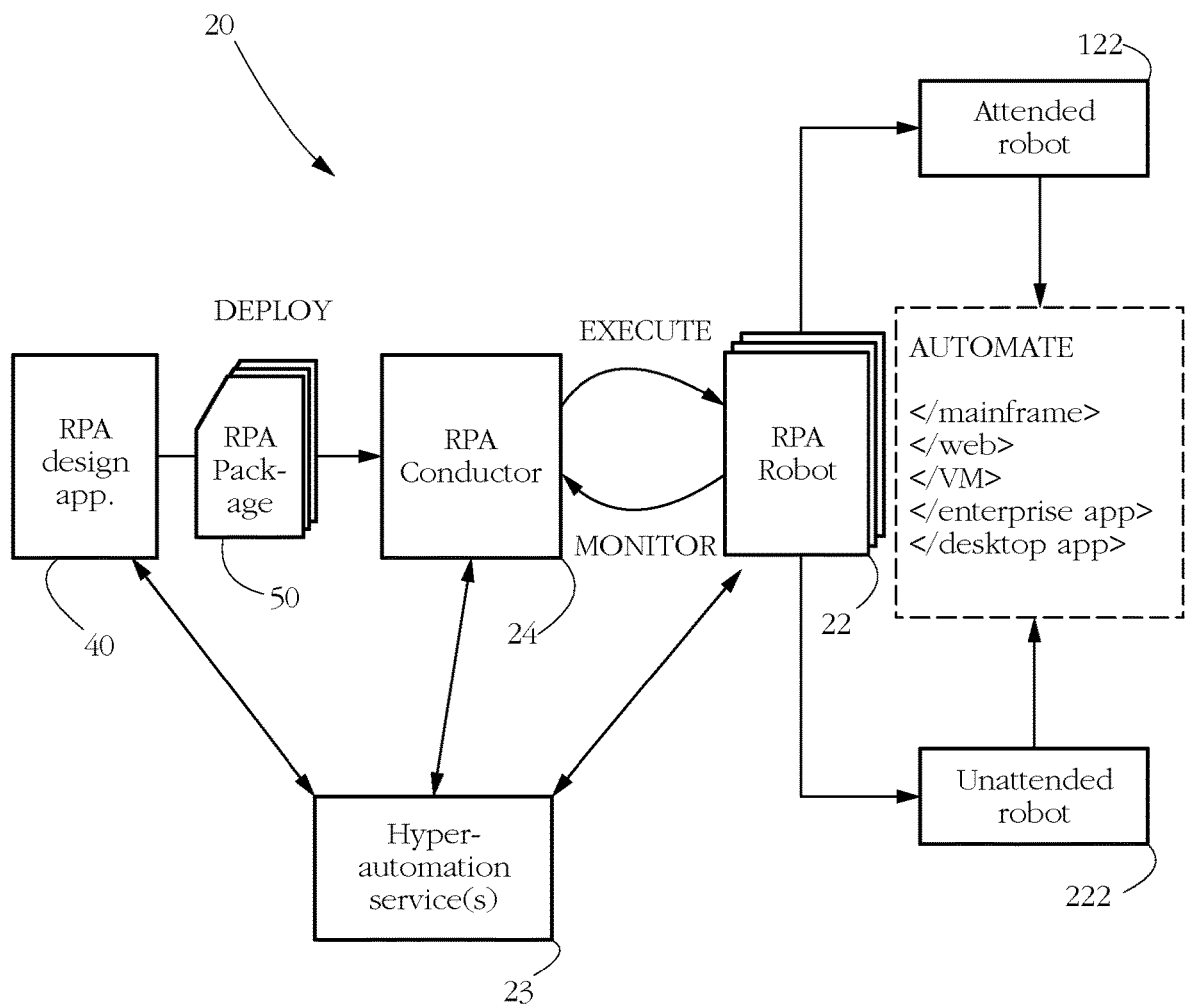
FIG. 2 illustrates an exemplary RPA system according to some embodiments of the present invention.

FIG. 2 illustrates exemplary components and operation of an RPA system 20 according to some embodiments of the present invention. RPA system 20 may form a part of hyper-automation system 10 of FIG. 1. RPA system 20 includes an RPA design application 40 that enables a developer to build automations, by designing and implementing RPA workflows. For instance, application 40 may expose a user interface and set of tools that give the developer control of the execution order and the relationship between activities of a workflow. One commercial example of RPA design application 40 is UiPath Studio™.

Some types of RPA workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed, it may be encoded in computer-readable form, such as an RPA script or an RPA package 50 (FIG. 2). An RPA script comprises a specification of the respective workflow, the specification comprehensible to (or interpretable by) RPA robot 22. RPA scripts may be formulated according to any data specification format known in the art, for instance in a version of an extensible markup language (XML), Javascript Object Notation (JSON), or a programming language such as C#, Visual Basic, Java, etc. Alternatively, RPA scripts may be formulated in an RPA-specific version of bytecode, or even as a sequence of instructions formulated in a natural language such as English, Spanish, Japanese, etc. In some embodiments, one or more related RPA scripts are bundled together with other files and/or metadata, to form RPA package 50. For instance, beside RPA scripts, RPA package 50 may comprise a specification of a resource required for executing the respective workflow(s). Exemplary resources include a location of a file (e.g., path, URL), a filename, and a set of credentials for accessing a particular machine, computer program, or service, among others. In what is commonly known in the art as a 'build', RPA scripts may be pre-compiled into a set of executable files which may include a main executable and accompanying libraries, resource specifications and metadata, to form RPA package 50. Package 50 may use any data specification format known in the art. For instance, some embodiments of package 50 comprise a NuGet package of .NET assembly files.

A skilled artisan will appreciate that RPA design application 40 may comprise multiple components/modules, which may execute on distinct physical machines. In one such example illustrating a cloud computing embodiment of the present invention, RPA design application 40 may execute in a client-server configuration, wherein one component of application 40 may expose an automation design interface on the developer's computer, and another component of application 40 executing on a remote server may assemble the workflow and formulate/output RPA package 50. For instance, a developer may access the automation design interface via a web browser executing on the developer's computer, while the software processing the user input received at the developer's computer actually executes on the server.

In some embodiments, a workflow designed in RPA design application 40 is deployed to an RPA conductor 24, for instance in the form of an RPA package as described above. Per the above, in some embodiments, conductor 24 may be part of hyper-automation core system 30 illustrated in FIG. 1. One commercial example of conductor 24 is UiPath Orchestrator™.

Conductor 24 orchestrates one or more RPA robots 22 that execute the respective workflow. Such 'orchestration' may include creating, monitoring, and deploying computing resources for robots 22 in an environment such as a cloud computing system and/or a local computer. Orchestration may further comprise, among others, deployment, configuration, queueing, monitoring, logging of robots 22, and/or providing interconnectivity for robots 22. Provisioning may include creating and maintaining connections between robots 22 and conductor 24. Deployment may include ensuring the correct delivery of software (e.g. RPA packages 50, individual workflow specifications) to robots 22 for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch®, Redis®). Conductor 24 may further act as a centralized point of communication for third-party solutions and/or applications.

RPA robots 22 are execution agents (e.g., computer programs) that implement automation workflows targeting various systems and applications including, but not limited to, mainframes, web applications, virtual machines, enterprise applications (e.g., those produced by SAP®, SalesForce®, Oracle®, etc.), desktop and laptop applications, mobile device applications, wearable computer applications, etc. One commercial example of robot 22 is UiPath Robots™.

In some embodiments, to mimic a human user's interaction with a user interface of a target application, RPA robot 22 interfaces with a set of RPA drivers 25 executing on the respective host. Such drivers generically represent software modules that carry low-level operations such as moving a cursor on screen, registering and/or executing mouse, keyboard, and/or touchscreen events, detecting a current posture/orientation of a handheld device, detecting a current accelerometer reading, taking a photograph with a smartphone camera, etc. Some such drivers form a part of the local operating system. Other RPA drivers 25 may implement various application-specific aspects of a user's interaction with complex target applications such as SAP®, Citrix® virtualization software, Microsoft Excel®, etc. One particular example comprises a browser driver, which may be embodied as a set of browser-compatible scripts (e.g. JavaScript®). When injected into a web page currently displayed within the browser, such a browser driver may identify various elements of the respective web page (e.g., buttons, menus, form fields, etc.), and may invoke a specific functionality of a respective element (e.g., type into a form field, select a menu item, toggle a checkbox, etc.). Other exemplary RPA drivers 25 include the Microsoft® WinAppDriver, XCTest drivers from Apple, Inc., and UI Automator drivers from Google, Inc.

Types of robots may include attended robots 122, unattended robots 222, development robots (similar to unattended robots, but used for development and testing purposes), and nonproduction robots (similar to attended robots, but used for development and testing purposes), among others. Some activities of attended robots 122 are triggered by user events and/or commands and operate alongside a human operator on the same computing system. In some embodiments, attended robots 122 can only be started from a robot tray or from a command prompt and thus cannot be entirely controlled by conductor 24 and cannot run under a locked screen, for example. Unattended robots may run unattended in remote virtual environments and may be responsible for remote execution, monitoring, scheduling, and providing support for work queues.

In some embodiments executing in a Windows® environment, robot 22 installs a Microsoft Windows® Service Control Manager (SCM)-managed service by default. As a result, such robots can open interactive Windows® sessions under the local system account and have the processor privilege of a Windows® service. For instance, a console application may be launched by a SCM-managed robot. In some embodiments, robot 22 may be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows® Server 2012), multiple robots may be running at the same time, each in a separate Windows® session, using different usernames.

In some embodiments, robots 22 are split into several components, each being dedicated to a particular automation task. The robot components in some embodiments include, but are not limited to, SCM-managed robot services, user-mode robot services, executors, agents, and command-line. Depending on platform details, SCM-managed and/or user-mode robot services manage and monitor Windows® sessions and act as a proxy between conductor 24 and the host machines (i.e., the computing systems on which robots 22 execute). These services are trusted with and manage the credentials for robots 22. The command line is a client of the service(s), a console application that can be used to launch jobs and display or otherwise process their output.

Figure 3:
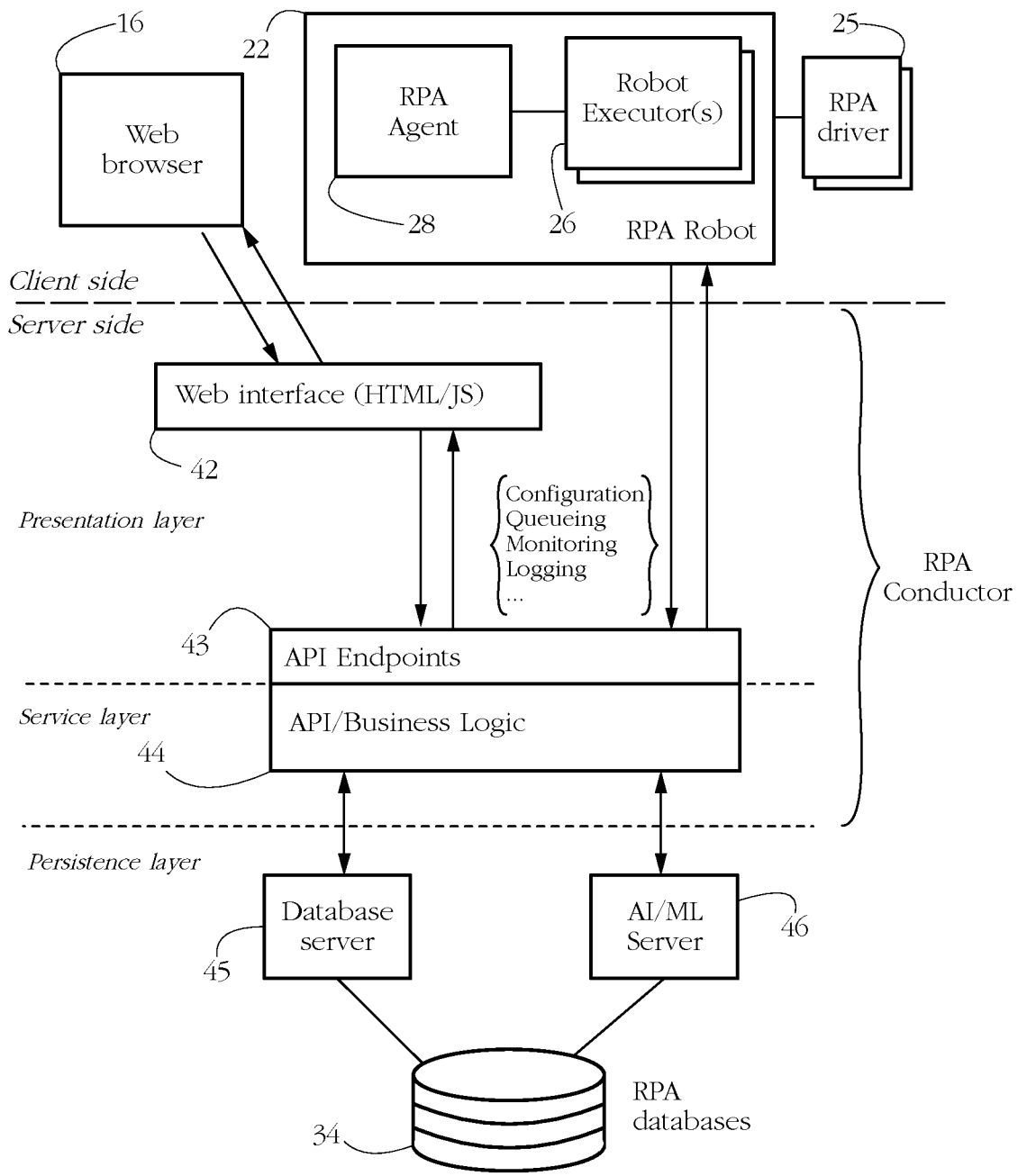
FIG. 3 shows an exemplary deployed RPA system executing in a client-server configuration according to some embodiments of the present invention.

An exemplary set of robot executors 26 and an RPA agent 28 are illustrated in FIG. 3. Robot executors 26 may run given jobs under a Windows® session. Executors 26 are configured to receive RPA package 50 specifying a workflow (e.g., sequence of robotic activities), and to execute the respective package which effectively amounts to carrying out the respective sequence of RPA activities. In some embodiments, package 50 comprises pre-compiled executable code. In other exemplary embodiments, robot executor(s) 26 comprise an interpreter (e.g., a just-in-time interpreter or compiler) configured to translate a received RPA script comprising a workflow specification (e.g., bytecode, XML, JSON etc.) into runtime code comprising processor instructions for carrying out the respective workflow. Executing RPA package 50 may thus comprise executor(s) 26 translating a workflow specification included in package 50 and instructing a processor of the respective host machine to load the resulting runtime code into memory and to launch the runtime code into execution.

RPA agent 28 may manage the operation of robot executor(s) 26. For instance, RPA agent 28 may select tasks/scripts for execution by robot executor(s) 26 according to an input from a human operator and/or according to a schedule. Agent 28 may start and stop jobs and configure various operational parameters of executor(s) 22. When robot 22 includes multiple executors 26, agent 28 may coordinate their activities and/or inter-process communication. RPA agent 28 may further manage communication between RPA robot 22 and conductor 24 and/or other entities.

Exemplary RPA system 20 in FIG. 2 forms a part of hyper-automation system 10 (see FIG. 1). As such, robots 22 may interact with various components and use various aspects of hyper-automation core system 30, illustrated generically as hyper-automation services 23 in FIG. 2. For instance, developers may use RPA design application 40 to build and test RPA robots 22 that utilize AI/ML models 36.

Such RPA robots 22 may send input for execution of the AI/ML model(s) and receive output therefrom via hyperautomation core system 30. Robot 22 may be a listener, as described above. These listeners may provide information to core hyper-automation system 30 regarding what users are doing when they use their computing systems. This information may then be used by hyper-automation system 30 for process mining, task mining, task capture, etc. In another exemplary embodiment, hyper-automation services 23 may expose data labeling functionality to user of the computing system hosting robot 22 or to another computing system that robot 22 provides information to. For instance, if robot 22 calls a computer vision AI/ML model 36 but the respective model does not correctly identify a button on the screen, the user may explicitly provide a correct identification. Such information may be passed on to hyper-automation core system 30 and then used for re-training the respective AI/ML model.

In some embodiments, selected components of hyperautomation system 10 and/or RPA system 20 may execute in a client-server configuration. In one such configuration illustrated in FIG. 3, RPA robot 20 including executor(s) 26 and RPA agent 28 may execute on a client side, for instance on one of RPA client computers 12a-c in FIG. 1. In turn, the functionality of conductor 24 and/or other services of hyperautomation core system 30 may be implemented on the server side, e.g., on remote RPA servers 32 (FIG. 1). It should be noted that the client side, the server side, or both, may include any desired number of computing systems (e.g., physical or virtual machines) without deviating from the scope of the invention. The illustrated RPA system may be cloud-based, on-premises, or a combination thereof, offering enterprise-level, user-level, or device-level automation solutions for automation of different work processes.

Robot 22 may run several jobs/workflows concurrently. RPA agent 28 (e.g., a Windows® service) may act as a single client-side point of contact of multiple executors 26. Agent 28 may further manage communication between robot 22 and conductor 24. In some embodiments, communication is initiated by RPA agent 28, which may open a WebSocket channel to conductor 24. Agent 28 may subsequently use the channel to transmit notifications regarding the state of each executor 26 to conductor 24, for instance as a heartbeat signal. In turn, conductor 24 may use the channel to transmit acknowledgements, job requests, and other data such as RPA packages 50 to robot 22.

In one embodiment as illustrated in FIG. 3, conductor 24 includes a web interface 42 and a set of service modules comprising a set of Application Programming Interface (API) endpoints 43 and service APIs/business logic 44. A user may interact with conductor 24 via web interface 42 (e.g., by opening a dedicated web page on a browser 16), to instruct conductor 24 to carry out actions such as scheduling and/or starting jobs on robot 22, creating robot groups/pools, assigning workflows to robots, adding/removing data to/from queues, analyzing logs per robot or workflow, etc. Interface 42 may be implemented using Hypertext Markup Language (HTML), JavaScript® (JS), or any other data format known in the art.

Conductor 24 may carry out actions requested by the user by selectively calling service APIs/business logic 44 via endpoints 43. In addition, some embodiments use API endpoints 43 to communicate between RPA robot 22 and conductor 24, for tasks such as configuration, logging, deployment, monitoring, and queueing, among others. API endpoints 43 may be set up using any data format and/or communication protocol known in the art. For instance, API endpoints 43 may be Representational State Transfer (REST) and/or Open Data Protocol (OData) compliant.

Configuration endpoints may be used to define and configure application users, permissions, robots, assets, releases, etc. Logging endpoints may be used to log different information, such as errors, explicit messages sent by robot 22, and other environment-specific information. Deployment endpoints may be used by robot 22 to query the version of RPA package 50 to be executed. Queueing endpoints may be responsible for queues and queue item management, such as adding data to a queue, obtaining a transaction from the queue, setting the status of a transaction, etc. Monitoring endpoints may monitor the execution of web interface 42 and/or RPA agent 28.

Service APIs 44 comprise computer programs accessed/called through configuration of an appropriate API access path, e.g., based on whether conductor 24 and an overall hyper-automation system have an on-premises deployment type or a cloud-based deployment type. Exemplary APIs 44 provide custom methods for querying stats about various entities registered with conductor 24. Each logical resource may be an OData entity in some embodiments. In such an entity, components such as a robot, process, queue, etc., may have properties, relationships, and operations. APIs 44 may be consumed by web application 42 and/or RPA agent 28 by getting the appropriate API access information from conductor 24, or by registering an external application to use the OAuth flow mechanism.

In some embodiments, a persistence layer of server-side operations implements a database service. A database server 45 may be configured to selectively store and/or retrieve data to/from RPA databases 34. Database server 45 and database 34 may employ any data storage protocol and format known in the art, such as structured query language (SQL), ElasticSearch®, and Redis®, among others. Exemplary data stored/retrieved by server 45 may include configuration parameters of robots 22 and robot pools, as well as data characterizing workflows executed by robots 22, data characterizing users, roles, schedules, queues, etc. In some embodiments, such information is managed via web interface 42. Another exemplary category of data stored and/or retrieved by database server 45 includes data characterizing the current state of each executing robot, as well as messages logged by robots during execution. Such data may be transmitted by robots 22 via API endpoints 43 and centrally managed by conductor 24, for instance via API logic 44. Another exemplary category of data stored and/or retrieved by database server 45 includes form-filling strategy packages and/or strategy ranking records as described in detail below.

Server 45 and database 34 also store/manage process mining, task mining, and/or task capture-related data, for instance received from listener modules executing on the client side as described above. In one such example, listeners may record user actions performed on their local hosts (e.g., clicks, typed characters, locations, applications, active elements, times, etc.) and then convert these into a suitable format to be provided to and stored in database 34.

In some embodiments, a dedicated AI/ML server 46 facilitates incorporation of AI/ML models 36 into automations. Pre-built AI/ML models, model templates, and various deployment options may make such functionality accessible even to operators who lack advanced or specialized AI/ML knowledge. Deployed robots 22 may call AI/ML models 36 by interfacing with AI/ML server 46. Performance of the deployed AI/ML models 36 may be monitored and the respective models may be re-trained and improved using human-validated data. AI/ML server 46 may schedule and execute training jobs and manage training corpora. AI/ML server 46 may further manage data pertaining to AI/ML models 36, document understanding technologies and frameworks, algorithms and software packages for various AI/ML capabilities including, but not limited to, intent analysis, natural language processing (NLP), speech analysis and synthesis, computer vision, etc.

Figure 4:
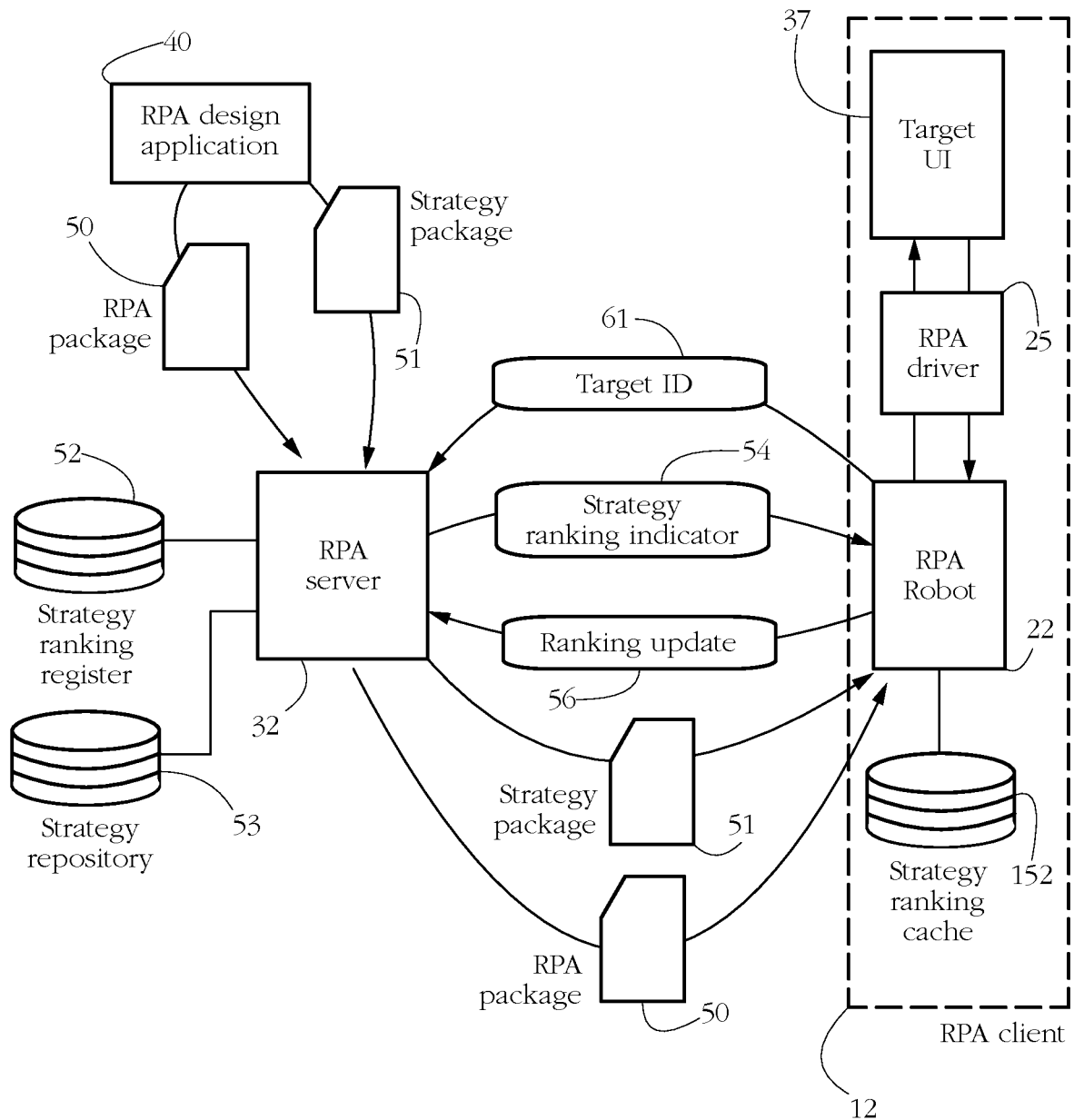
FIG. 4 illustrates an exemplary data exchange between an RPA conductor and RPA robot(s) according to some embodiments of the present invention.

FIG. 4 shows an exemplary form-filling RPA system according to some embodiments of the present invention. In an exemplary embodiment illustrating an airport check-in scenario, an RPA robot 22 may be configured to receive a scan of a passenger's passport and automatically extract structured data from it, such as a name, nationality, and passport number. The RPA robot may then automatically enter passenger data into a web-based airport check-in form. To carry out the form-filling activities, robot 22 may identify each field of the respective form and fill in the appropriate information.

Figure 5:
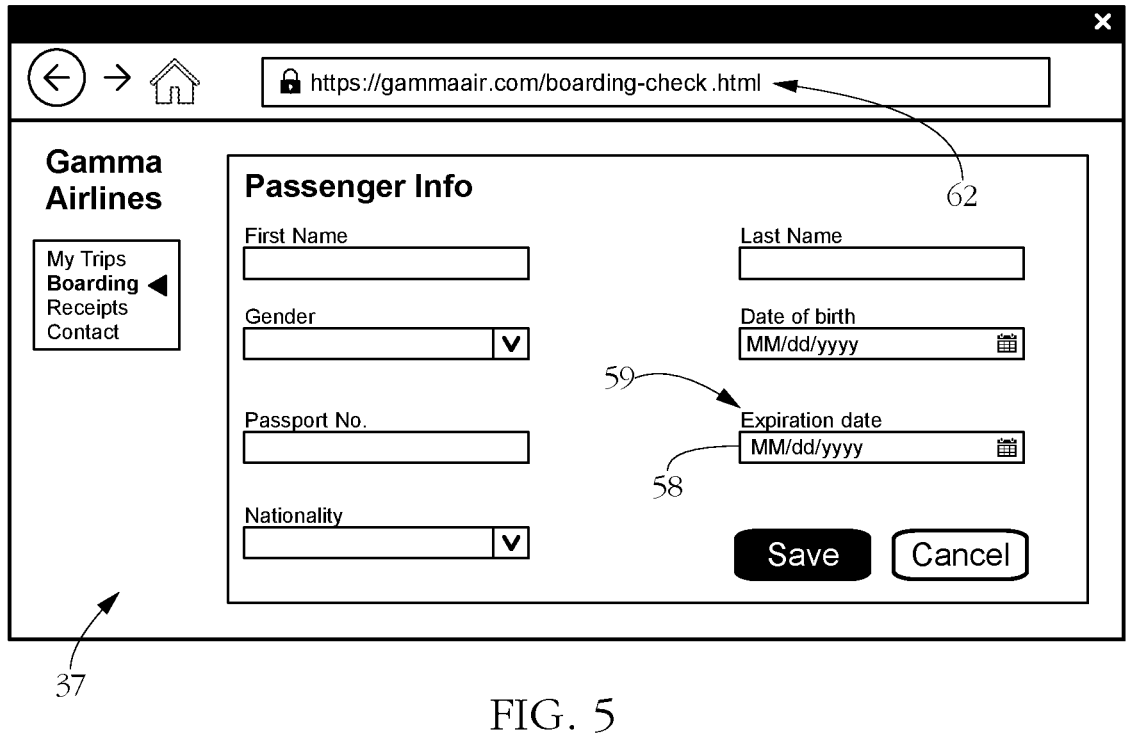
FIG. 5 illustrates an exemplary form targeted for automatic fill-in according to some embodiments of the present invention.

RPA robot 22 (FIG. 4) may execute on an RPA client 12, for instance a desktop computer located at the respective airport terminal, or a remote server computer operated by the respective airline. To execute the form-filling activities, robot 22 interacts with a target user interface (UI) 37 exposed by an RPA target application, such as a web browser in the current example. An exemplary target UI 37 as described herein is illustrated in FIG. 5 and comprises a form having multiple input fields 58. A skilled artisan will know that the look and content of the illustrated form is not meant to be limiting, and that similar forms may be displayed by other RPA target applications such as CRM and ERP platform clients, spreadsheet applications, and document viewer applications (e.g., Adobe® Reader®), among others.

Depending on the target application and target UI 37, input fields 58 may vary considerably in type and behavior. The HTML specification alone defines more than 20 distinct input types, including text, radio, checkbox, date, and password, among others. Some such field types have type-specific behaviors. For instance, clicking/tapping on a date field such as exemplary field 58 in FIG. 5 may display a calendar widget and expect a user input selecting a date via the calendar. Other field types allow the user to select input data from a dropdown list of options. Web designers may further turn on various optional features such as autocomplete and/or add input validation procedures restricting the format and/or content of the input data (e.g., to ensure that numbers stay between predetermined bounds, that dates are written in a pre-determined format, that the respective text does not include certain special characters, etc.). The behavior of input fields exposed by some enterprise application UIs may be even more complex. For instance, selecting an option from a drop-down menu may cause the display of a pop-up window that further exposes another set of input fields, etc. An RPA developer trying to design a form-filling robot may therefore need precise a priori knowledge about the type and behavior of an input field the robot will encounter at runtime, in order to instruct the robot on an appropriate manner of filling the respective field.

Some embodiments of the present invention rely on the observation that, taking into account the broad variety of input types and associated behavior variations, an RPA robot relying on just one pre-determined strategy for filling in a given form field may fail for a number of reasons. For instance, one of the details of the target form may change suddenly so the respective fill-in procedure no longer works. In one such example, developers of target UI 37 may change a simple text field to a dropdown field. An RPA robot configured to just type into the respective field may unexpectedly be presented with a set of options to choose from, and may not be able to respond appropriately.

To address such shortcomings, some embodiments endow RPA robot 22 with multiple alternative strategies for filling in the respective field, so that when one strategy fails, robot 22 may attempt at least another strategy. The respective plurality of form-filling strategies may be specific to a type of the respective input field, i.e., there may be one plurality of strategies associated with drop-down fields and another plurality of strategies associated with date fields, etc. In some embodiments, strategies may be ranked to indicate, for instance, an order in which they should be tried and/or a likelihood of success in filling in the respective form/field.

Figure 6:
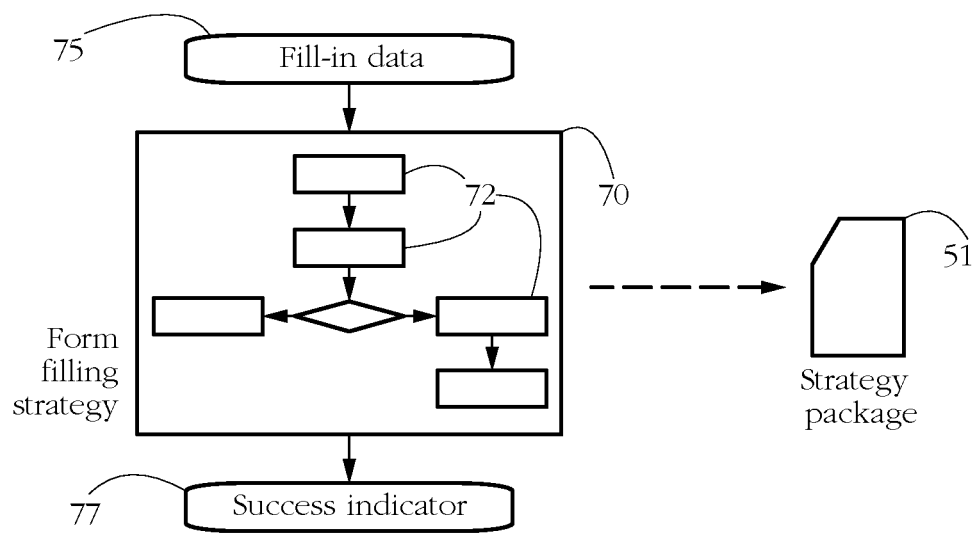
FIG. 6 shows an exemplary form filling strategy according to some embodiments of the present invention.

In some embodiments, form-filling strategies are developed independently of other RPA workflows, for instance in the form of libraries that may be included in RPA package 50 at design time or fetched on-demand from a strategy repository 53 (FIG. 4). FIG. 6 shows an exemplary form-filling strategy 70 according to some embodiments of the present invention. Strategy 70 comprises an RPA workflow for filling in at least one input field of a form, and may have input and/or output variables. For instance, strategy 70 may be configured to receive a set of fill-in data 75 and to output a success indicator 77 indicative of whether the respective strategy was successful in introducing data 75 into the respective input field.

In some embodiments, strategy 70 comprises a sequence of individual RPA activities 72 collectively carrying out the respective form-filling task. Activities 72 may include any RPA activity known in the art. In one example of a strategy for filling in a dropdown field, activities 72 may include, among others, determining whether the respective input field displays a dropdown symbol (e.g., arrow, triangle); when yes, automatically clicking the respective symbol to display the respective dropdown list; parsing the list to identify an item that matches fill-in data 75; and selecting the respective item from the list. Another exemplary strategy 70 for filling in a dropdown input field may include RPA activities 72 for attempting to type into the respective field, determining whether the respective field responds by suggesting an input value; when yes, determining whether the suggested value matches the desired input value; and when yes, clicking on the respective suggested value. Some activities 72 may be more complex and/or comprise calling out external resources or services. In one such example, target UI 37 may be configured to receive input formulated in English and/or a Latin alphabet. However, some of fill-in data 75 may be provided in a different language and/or script (e.g., Arabic, Chinese). In such situations, some activities 72 may comprise determining whether the incoming data is in the expected format; when no, transmitting the respective data to a remote server (e.g., hyper-automation service 23 in FIG. 2) for image analysis, translation and/or further manipulation, and receiving correctly-formatted input data in response.

In some embodiments, RPA developers may employ an instance of RPA design application 40 to develop form-filling strategy 70 as they would any other RPA workflow. Strategy 70 may then be exported in computer-readable form as a strategy package 51. Package 51 may use the same data format as a regular RPA package (see description above, in relation to FIG. 2). For instance, package 51 may include an RPA script comprising a computer-readable specification of RPA activities 72, dependences and/or other resources required for RPA robot 20 to execute strategy 70.

Strategy packages 51 may be stored in a strategy repository 53, for instance in the form of an indexed data structure enabling a selective insertion and retrieval. Repository 53 may be managed by a database server and may form a part of RPA databases 34 (FIG. 1). Having packages 51 retrievable from a central repository enables form-filling strategies 70 to be developed and maintained independently of other RPA workflows, and further enables sharing and re-using such strategies across multiple automations. In some embodiments, form-filling strategies 70 may be further included in RPA design application 40 as building blocks for RPA automations. In one such example, application 40 may give developers access to various form-filling strategies 70 by way of a dedicated activity menu listing a plurality of available strategies for filling in selected form fields.

To further facilitate sharing and re-use of prefabricated strategies 70, some embodiments maintain an association between target UIs 37 and strategies 70 usable for filling in forms displayed by the respective target UIs. Such embodiments rely on the observation that some UIs 37, for instance interfaces exposed by complex ERP platforms, may be accessed repeatedly by the same robot 22 and/or may targeted by multiple automations and/or robots 22 concurrently. In one such example, each of a plurality of workflows may be configured to extract data from a distinct source (e.g., a distinct type of document, from a distinct software application, etc.). However, all the respective workflows may use the same online form to transfer the respective data to the ERP system. Maintaining an association between the respective form and a set of strategies 70 for filling in the respective form effectively amounts to a shared knowledgebase about what strategies currently work for the respective form/target UI. When a particular strategy suddenly fails, the respective robot may search among the available options for a strategy that works, and in response, update the knowledgebase to associate the respective form/field with the newly identified, successful strategy. Other robots and workflows that subsequently target the respective form/field may then directly use the new successful strategy, thus improving automation performance and user experience.

Some embodiments store the knowledgebase associating target UIs 37 with form-filling strategies 70 in the form of a strategy ranking register 52 and/or a local strategy ranking cache 152 (FIG. 4). Register 52 and cache 152 may comprise searchable collections of records having any data format known in the art. Register 52 may form a part of RPA databases 34 (FIG. 1) and may be centrally managed by a database server so that its contents are made accessible to RPA robots 22 executing on various RPA hosts.

In an exemplary embodiment shown in FIG. 7-A, register 52 and/or cache 152 store a plurality of strategy ranking records 60 illustrated as individual rows in a relational database table. Each row/record 60 comprises a set of target identification data such as a form ID 62, a field ID 59, and a field type indicator 64, collectively identifying a particular input field targeted for automatic filling. Form ID 62 may comprise for instance a uniform record identifier (URI) of target UI 37 (see e.g., FIG. 5 wherein the form is identified by a uniform record locator/URL). When target UI 37 is not web-based, form ID 62 may comprise other data that may identify UI 37 and/or a specific form displayed by UI 37. For instance, some embodiments may use an identifier (e.g., process ID) of a computer program displaying UI 37, an attribute (e.g., name) of a window currently displaying UI 37, a name of a document that includes the respective form, etc. In some embodiments, form ID 62 may further include a digest of UI 37 comprising a list of field identifiers (e.g., field labels) of all fields displayed by UI 37. Such data may increase a likelihood of unambiguous identification of the respective UI/form, in cases wherein a URL or some other identifier may be subject to change.

Field ID 59 may comprise any data that identifies a target input field among other elements of target UI 37. For instance, field ID 59 may comprise a text label displayed next to the respective input field, as illustrated in FIGS. 5 and 7-A. Another exemplary field ID 59 may comprise a set of attribute-value pairs extracted from a UI tree representation of UI 37, the UI tree representation managed by the local operating system. Such a set of attribute-value pairs may act as an identifier by indicating a unique position within the respective UI tree. Other field ID data may include an image of the respective input field, a label or title displayed next to the respective field, etc.

Field type indicator 64 indicates a type of the respective input field, for instance by way of a number or label distinguishing the respective type of input from other types. In the example illustrated in FIGS. 5 and 7-A, the label "43" may indicate a date input with attached calendar widget, while the label "2" may indicate a simple type-into text field. Field-type indicators 64 may further distinguish between web-based form fields and inputs displayed by other computer programs, such as spreadsheet applications and various legacy software.

Target identifiers such as items 59, 62, and 64 collectively identify a target input field (a date input labelled "Expiration date" and displayed by a webpage located at the URL "gammaair.com/boarding-check.html", in the current example). In some embodiments, strategy ranking record 60 further includes an identifier of at least one form-filling strategy 70 usable for filling in a field characterized by the respective target identifiers. In a preferred embodiment, record 60 includes a strategy ranking indicator 54 identifying a plurality of alternative form-filling strategies 70 applicable to the respective input, and further indicative of a ranking of the respective strategies. In some embodiments, strategy rankings indicate an order in which the respective strategies should be attempted in search for a successful fill-in of the respective field, for instance with higher-ranking strategies to be attempted before lower-ranking ones.

An exemplary ranking is determined according to a measure of performance of each respective strategy 70, such as a likelihood that the respective strategy will be successful in filling-in the respective form field, a computational cost associated with each respective strategy, a complexity of each strategy (e.g., count of individual steps), an amount of change to a state of the respective field caused by an execution of the respective strategy, etc. Other exemplary strategy selection and ranking criteria may include a device type, with some strategies promoted on some devices (e.g., smartphones) and demoted on others (e.g., desktop computers). A content of ranking indicator 54 may further vary according to, among others, a current location (e.g., geographical position, cloud platform, network provider, etc.) of RPA client 12 executing the respective automation, an identity of a customer carrying out the respective automation, and a service agreement associated with the respective automation.

In the exemplary embodiment illustrated in FIG. 7-A, ranking indicator 54 comprises an ordered list of strategy identifiers $h_k$, each uniquely associated with a respective form-filling strategy 70. An exemplary strategy identifier $h_k$ may include an integrity hash, e.g., a hash calculated over a strategy package 51 comprising a specification of the respective form-filling strategy 70 (see e.g., FIG. 6). Another exemplary strategy identifier $h_k$ comprises an index (e.g., hash index) pointing to a database record associated with the respective strategy 70. In FIG. 7-A, strategy repository 53 associates index $h_k$ with a strategy location indicator 66 (e.g., URL) indicative of an address for retrieving strategy package 51 specifying the respective form-filling strategy.

A skilled artisan will understand that there may be many ways of associating target input fields 58 with form-filling strategies 70 and rankings, and that such implementation details are not meant to be limiting. In an alternative embodiment, record 60 may be defined by a set of attribute-value pairs formulated in a version of extensible markup language (XML), Javascript® object notation (JSON), or any other declarative data format. In the example illustrated in FIG. 7-B, field ID 59 comprises a value of the "Key" attribute, field-type indicator 64 comprises a value of the "Type" argument, form ID 62 and ranking indicator 54 comprise current values of the "App Identifier" and "Trace" attributes, respectively. The illustrated form ID 62 further characterizes target UI 37 as being a web-based form.

The embodiments illustrated in FIG. 7-A-B further provide an exemplary ranking of strategies, wherein indicator 54 comprises an ordered sequence of strategy IDs and wherein a position within the ordered sequence is indicative of a current rank. For instance, in FIG. 7-A, the strategy identified by $h_{12}$ may have a higher rank than the strategy identified by $h_2$, which in turn may have a higher rank than the strategy identified by $h_8$, etc. In FIG. 7-B. "Strategy8" may be ranked higher than "Strategy3", etc.

A skilled artisan will understand that there may be many ways of attaching rankings to a collection of items, and that such implementation details are not meant to be limiting. In one exemplary alternative embodiment, ranking indicator 54 may comprise an n-sized vector of numbers $r_k$ wherein n is a count of available strategies 70. Each element $r_k$ may correspond to a distinct form-filling strategy 70, while its value may indicate a current rank of the respective strategy.

Figure 8:
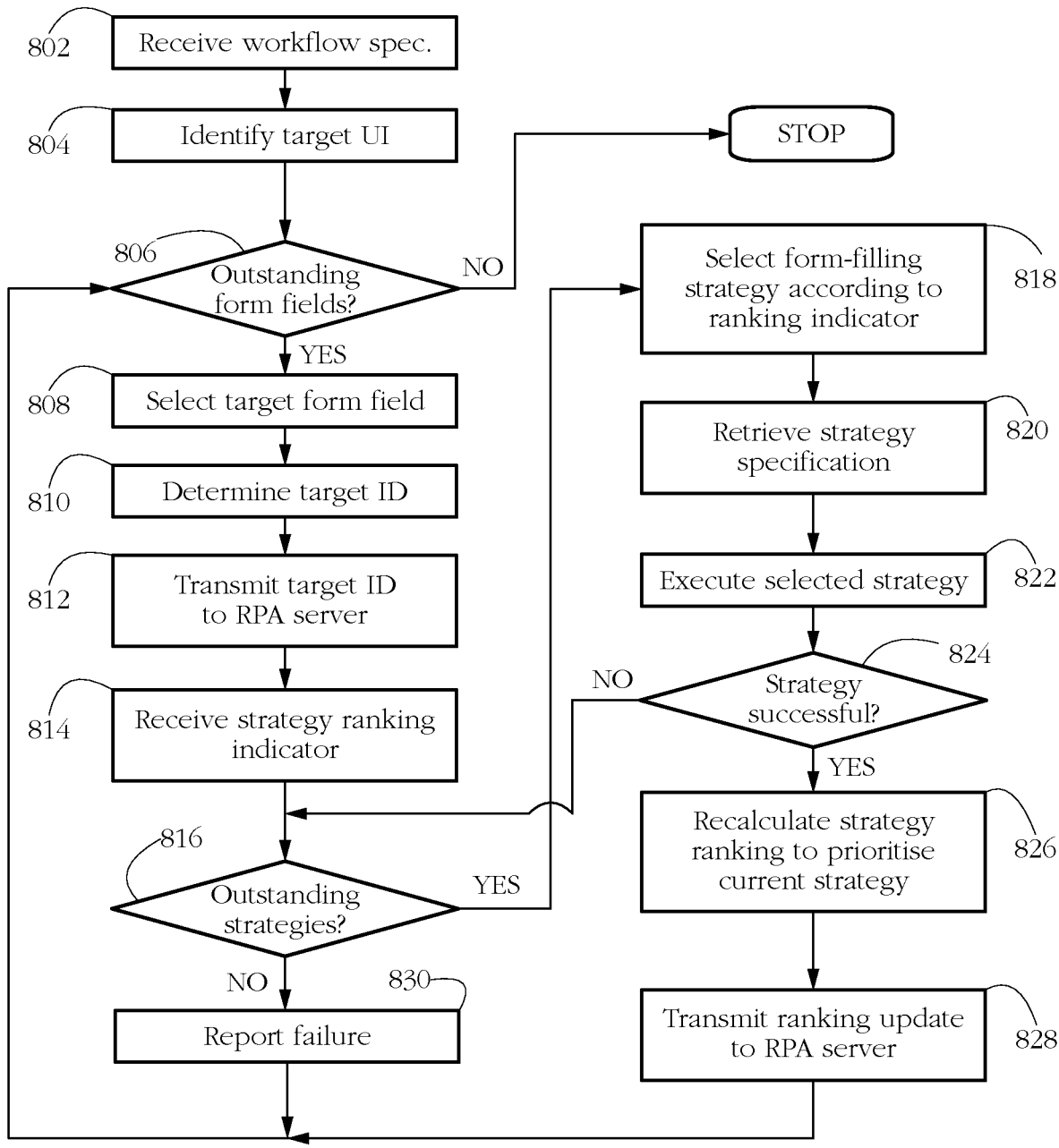
FIG. 8 shows an exemplary sequence of steps performed by an RPA robot according to some embodiments of the present invention.

FIG. 8 shows an exemplary sequence of steps performed by RPA robot 22 in some embodiments of the present invention. A step 802 may receive a specification of an RPA workflow including activities for filling in selected fields of a target form. The workflow specification may be delivered to robot 22 in the form of RPA package 50 transmitted by an instance of RPA conductor 24 executing on remote RPA server 32 (see e.g., FIG. 4). In a further step 804, robot 22 may identify the user interface targeted by the respective automation (e.g., target UI 37 in FIGS. 4-5). The target UI may be explicitly specified by package 50. In an alternative embodiment, robot 22 may prompt a user to select or otherwise indicate target UI 37, for instance by pointing the robot to a specific URL or to a UI currently displayed on screen.

Step 804 may further comprise setting up at least one RPA driver 25 for interacting with UI 37. In the case of a web-based user interface, some embodiments inject a set of scripts into target UI 37, the respective scripts collectively implementing the functionality of a driver when executed by the browser application displaying UI 37. The respective driver may effectively carry out the form-filling activities specified in the current RPA workflow and communicate with robot 22 in the process. In such embodiments, setting up driver 25 may further include configuring a communication channel between robot 22 and the respective driver. In the case of a web-based interface, an exemplary communication channel may be established using a web extension mechanism. Such implementation details go beyond the scope of the present description.

The received RPA workflow specification may explicitly instruct robot 22 which set of input fields of target UI 37 to fill. In an alternative embodiment, an autonomous robot may attempt to fill in all fields displayed by the respective UI, or independently determine which fields to fill according to some pre-determined criterion or algorithm. For each such target input 58 (i.e., while a step 806 returns a YES), a sequence of steps 808-810 may determine a target ID 61 comprising a set of characteristics of the respective input field, such as form ID 62, input type 64 and/or field ID 59 as described above in relation to FIGS. 7-A-B. Depending on implementation, such target ID data may be specified in RPA package 50 or may be determined by an RPA driver on the spot by analyzing target UI 37. When UI 37 is displayed by a browser application, the RPA driver may derive target ID data (e.g., a type of input field, a label displayed next to an input field, etc.) for instance by parsing a document object model (DOM) of UI 37. Another exemplary embodiment may capture an image of target UI 37, transmit the respective image to an AI image-processing module (e.g., AI models 36 in FIG. 1), and get back target ID data 61 in response.

Next, in a sequence of steps 812-814, RPA robot 22 may look-up a strategy ranking record having the respective target ID data. The present disclosure will only describe a remote lookup into centralized strategy ranking register 52 (FIG. 4). However, a skilled artisan will know that similar lookups may be carried out into a local ranking cache 152 if available. Some embodiments may search for the strategy ranking record in local cache 152 and only carry out a remote lookup if a record associated with the respective target ID cannot be found locally and/or if the local cache has expired. Step 812 may comprise formulating a query to RPA server 32, the query including target ID data 61 identifying at least one input field displayed by target UI 37. The format and content of the respective query may depend on implementation.

Figure 9:
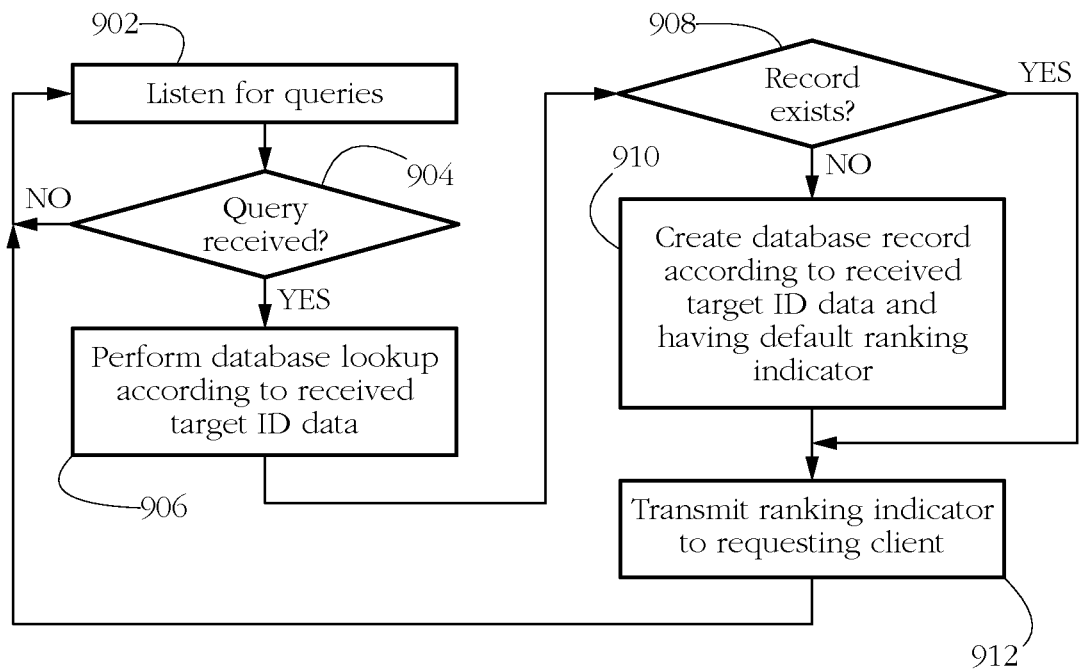
FIG. 9 shows an exemplary sequence of steps carried out by an RPA server according to some embodiments of the present invention.

FIG. 9 shows an exemplary sequence of steps performed by RPA server 32 in some embodiments of the present invention. The illustrated steps may be executed by a computer program such as RPA conductor 24 and/or software components of database server 45 (e.g., FIG. 3). A sequence of steps 902-904 may listen for incoming queries from RPA clients 12. When a query is received, a step 906 performs a lookup into strategy ranking register 52 according to target ID data included in the respective query. Since register 52 effectively associates target ID data with strategy ranking indicators (see e.g., description above in relation to FIGS. 7-A-B), the lookup may produce ranking indicator 54 corresponding to an input field with the respective characteristics.

If no record 60 with the respective characteristics currently exists within register 52 (a step 908 may return a NO for instance when target UI 37 is new or hasn't been visited yet by robot 22), a step 910 may create a new strategy ranking record for an input field characterized by target ID data 61. In some embodiments, ranking indicator 54 of a new strategy ranking record may comprise a set of pre-determined default values. Stated otherwise, records 60 may be initialized to a set of default form-filling strategies 70 and rankings. Default form-filling strategies and rankings may be field-type specific, i.e., may differ from one type of input field to another. The content of the default ranking indicator may be static (e.g., defined by an RPA developer), or may be determined dynamically, according to a current content of register 52. For instance, some embodiments may identify within register 52 a family of records sharing some identifying data with the current target input, and determine the default ranking indicator according to the respective family of records. In one such example, a default ranking indicator may comprise a copy of another ranking indicator corresponding to another input of the same type (e.g., same type indicator 64) and/or location (e.g., same URL, same Internet domain, etc.) as the one included in the respective query.

In other exemplary embodiments, default strategies may be selected according to how they change the state of the respective input field. For instance, only strategies that cause reversible changes to the state of the respective input may be selected as default strategies, the choice allowing the respective input to be returned to its initial state in case the respective strategy fails. Meanwhile, the default ranking may be determined according to a size of a state change produced by each respective strategy, some embodiments prioritizing strategies that generate relatively smaller changes over others. For more details, please see below in relation to step 822 (FIG. 8).

In a step 912, server 32 may transmit ranking indicator 54 to the requesting RPA client. Depending on situation as described above, indicator 54 may comprise a result of the database lookup (output of step 906) or a default ranking indicator (output of step 908).

In a step 814 (FIG. 8), RPA robot 22 may receive ranking indicator 54 and identify a set of strategies 70 according to indicator 54. Robot 22 may then cycle through the respective strategies until it finds a successful one. When all the strategies indicated by ranking indicator 54 have failed, some embodiments report a failure to fill in the respective input field (a step 830) and advance to the next target input of UI 37.

A step 818 selects a strategy according to ranking indicator 54. Some embodiments select strategies in order of rank: the highest-ranking first, falling back on the lower-ranking ones. A step 820 may retrieve a specification of the selected strategy. Some embodiments include a substantial collection of form-filling specifications within RPA package 50. Alternative embodiments may retrieve strategy package 51 on demand from RPA server 32 (e.g., RPA conductor application/service 24), package 51 including a specification of the selected form-filling strategy.

A further step 822 may effectively execute strategy 70, i.e., carry out the sequence of RPA activities composing the respective strategy. Such RPA activities may include, for instance, clicking/tapping the respective input field, typing into the respective field, detecting the expansion of a drop-down menu, and parsing menu items to identify at least one item matching fill-in data 75. To carry out such activities, robot 22 may collaborate with RPA drivers 25 configured in step 804 (see details above).

In preparation for executing step 822, some embodiments may bring target input 58 back to its initial state, i.e., a state in which the respective input was when it was identified and selected for automatic filling. In such embodiments, steps 808-810 described above may further comprise determining and recording an initial state of the respective input. The state may be defined by a set of initial values of field-specific attributes, such values indicate for instance a default content of the respective input, whether a widget associated with the respective input is currently active/displayed or not, whether a drop-down list is currently displayed, etc. Then, in preparation for executing a new strategy (step 822), RPA robot 22 may collaborate with RPA drivers 25 to reset field-specific attributes of target input 58 to the initial values recorded in steps 808-810.

In an alternative exemplary embodiment, a specification of form-filling strategy 70 (e.g., strategy package 51) may include an indicator of a set of intermediate stages/reference points during the execution of the respective strategy, and an indicator of a reference state of target input 58 at each intermediate stage. An exemplary set of intermediate stages include stages in between consecutive RPA activities 72 (FIG. 6). An exemplary reference state may comprise a desired/expected state of input 58 at the respective intermediate stage within the strategy. In such embodiments, prior to executing each strategy, robot 22 may determine whether the current state of target input 58 matches any of the reference states associated with the respective strategy. When yes, instead of resetting input 58 to its initial state as described above, some embodiments may start executing strategy 70 from the intermediate stage that matches the current state of target input 58. In one such example, strategy A comprises simply typing input data 75 into target field 58. However, when field 58 unexpectedly opens a drop-down list of options in response to the typing, strategy A may fail to properly fill in the respective field. Robot 22 may then choose alternative strategy B, which attempts to type into the target field and then attempts to match input data 75 to any of the displayed drop-down options. However, in preparation for executing strategy B, robot 22 may first determine that failed strategy A has left target input 58 in a state wherein the drop-down list is already displayed, and therefore may start executing strategy B from an intermediate stage wherein the drop-down list is displayed.

In a step 824, robot 22 may determine whether the current strategy was successful in filling in the respective target input. In some embodiments, robot 22 measures success according to status reports and/or error messages generated during execution of the current strategy (step 822). See for instance success indicator 77 in FIG. 6. An alternative embodiment determines that the current strategy was successful when all RPA activities 72 of strategy 70 have completed execution. Such embodiments may compare a state of target input 58 at the completion of each activity 72 with a reference/expected state at that point during execution of strategy 70 and determine that the respective activity completed successfully when states match. (See description of reference states above.) Yet another exemplary embodiment may determine that the current strategy was successful only if the target input contains the desired fill-in data 75. To determine the current content of the target field, robot 22 may ask RPA driver(s) 25 to parse a programmatic representation of target UI 37 (e.g., DOM, UI tree, etc.). In another example, step 824 may comprise taking a snapshot of target UI 37 or of the target input and using an image-processing AI module to determine a current content of the target input.

In response to a successful fill-in, in a step 826 robot 22 may recalculate the current strategy rankings to promote the successful form-filling strategy, so that the respective strategy may be prioritized in subsequent attempts to fill in the respective target input. In a step 828, some embodiments then transmit a ranking update 56 to strategy ranking register 52 and/or local cache 152 (see e.g., FIG. 4).

Ranking update 56 may include an updated strategy indicator promoting the successful strategy with respect to other form-filling strategies. In an alternative embodiment, ranking update 56 may include at least an identifier of the successful strategy and a target ID identifying the respective target input. Additional data included in update 56 may comprise a list of failed strategies 70 attempted en route to the current successful fill-in and/or a content of associated success indicators 77, error messages, etc. Server 32 may then use such data to update ranking indicator 54 to promote/prioritize the successful strategy over other strategies currently associated with the respective target input. Failed strategies may be demoted, e.g., their ranking reduced so they are de-prioritized in future attempts to fill in the respective target input. Server 32 may then update ranking register 52 to include the updated ranking indicator.

Figure 10:
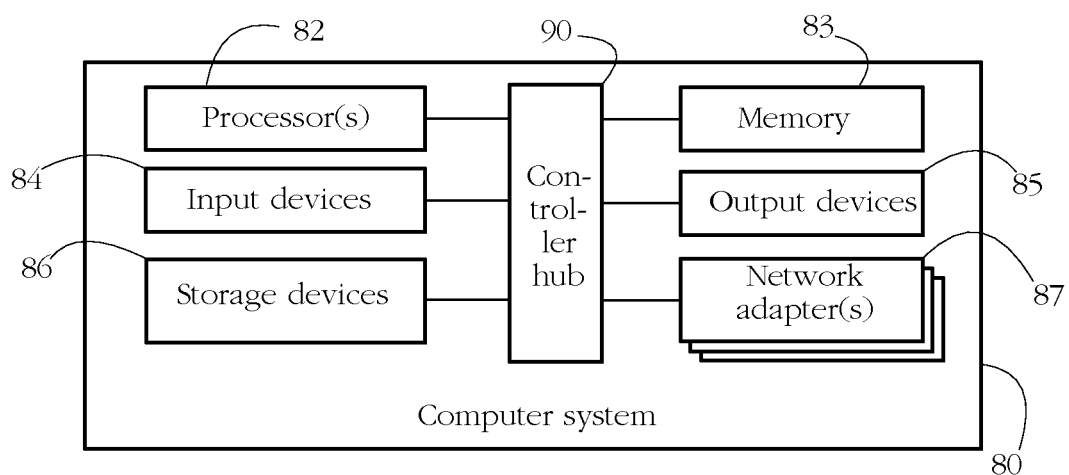
FIG. 10 shows an exemplary hardware configuration of a computer system programmed to execute some of the methods described herein.

FIG. 10 shows an exemplary hardware configuration of a computer system 80 programmed to execute some of the methods described herein. Computer system 80 may represent any of RPA clients 12a-c in FIG. 1, RPA client 12 in FIG. 4, as well as RPA server(s) 32. The illustrated appliance is a personal computer; other computer systems such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 83 may comprise volatile computer-readable media (e.g. dynamic random-access memory-DRAM) storing data and/or instruction encodings accessed or generated by processor(s) 82 in the course of carrying out operations. Input devices 84 may include computer keyboards, mice, trackpads, and microphones, among others, including the respective hardware interfaces and/or adapters allowing a user to introduce data and/or instructions into computer system 80. Output devices 85 may include display devices such as monitors and speakers among others, as well as hardware interfaces/adapters such as graphic cards, enabling the respective computing device to communicate data to a user. In some embodiments, input and output devices 84-85 share a common piece of hardware (e.g., a touch screen). Storage devices 86 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 87 include mechanical, electrical, and signaling circuitry for communicating data over physical links coupled to an electronic communication network (e.g., FIG. 1) and/or to other devices/computer systems. Adapter(s) 87 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 83, and/or a southbridge connecting processor 82 to devices 84, 85, 86, and 87.

The exemplary systems and methods described above facilitate the design and operation of RPA systems. In conventional RPA, the complete specification of a workflow, including a strategy for filling out each target field, is decided by an RPA developer at design time. However, in practice, popular target user interfaces such as web pages of complex enterprise resource planning (ERP) platforms may change quite often and without notice. For instance, the designers of the respective web page may change a type of input from simple text to a dropdown menu, or change the content or behavior of a dropdown menu to accommodate a new feature. When the RPA strategy for filling in the respective input is fixed, the robot cannot adapt to such changes in the target UI or to other unexpected events. A conventional RPA robot has no fallback form-filling strategies, and cannot learn from failure.

This lack of adaptability represents a major obstacle in the path to developing autonomous RPA robots, for instance AI-enabled form-filling robots that are capable of extracting structured data from a variety of source documents, interacting with a variety of forms, and/or dealing with unexpected situations.

In contrast to conventional RPA, some embodiments of the present invention supply an RPA robot with a strategy ranking indicator identifying multiple strategies for filling in a target form field, so that when one strategy fails, the RPA robot may autonomously fall back on an alternative strategy. In some embodiments, a form-filling strategy comprises a sequence of RPA activities for interacting with a specific type of form field (e.g., simple text input, dropdown list, date field, etc.). Strategies may be developed independently of other RPA workflows, may be delivered to robots as separate libraries, and/or may be included in RPA packages describing more complex workflows.

The ranking indicator further ranks the respective form-filling strategies, enabling the RPA robot to choose among the available strategies according to their rank. Some embodiments prioritize higher-ranking strategies. The strategy ranking indicator is dynamically updated to promote successful form-filling strategies and/or demote failing ones, and is made available to other instances of the RPA robot. Such dynamic updating increases the autonomy and performance of RPA robots and further improves user experience, since each RPA robot may now benefit from the experience of other robots previously attempting to fill out the same form. Stated otherwise, instead of carrying out the same laborious trial-and-error procedure, an RPA robot may directly try the strategy identified by a predecessor as being successful on the respective target input.

To facilitate sharing of information, some embodiments maintain a centralized strategy ranking database associating a distinct ranking indicator 54 with each distinct target UI 37 and further with each form field 58 displayed by the respective UI. For instance, web forms may be identified by their URLs and individual fields 58 by a characteristic set of attribute-value pairs extracted from a DOM of the respective web page. Some embodiments further optimize automatic form-filling by maintaining local strategy ranking caches on each RPA client machine executing RPA robots.

The dynamic updating of strategies and rankings may be viewed as a process of collective training of RPA robots based on real world data, wherein a fleet of independent and autonomous RPA robots collaborate to identify successful strategies for filling out various target forms and share such information among them in real time. Successful strategies may be promoted and failing ones demoted, all while maintaining a fallback mechanism wherein multiple alternative strategies are available for each target form field.

It will be clear to one skilled in the art that the above embodiments may be altered in many ways without departing from the scope of the invention. Accordingly, the scope of the invention should be determined by the following claims and their legal equivalents.

The invention claimed is:

1. A method of optimizing a robotic process automation (RPA) procedure of filling in a target form field displayed by a target user interface (UI), the method comprising employing at least one hardware processor of a computer system to:
retrieve a strategy ranking indicator from a database according to an identifier of the target UI, wherein the strategy ranking indicator identifies a plurality of alternative RPA strategies for filling in the target form field and further indicates a ranking among the plurality of alternative RPA strategies, and wherein each of the plurality of alternative RPA strategies comprises a distinct sequence of RPA activities configured to fill in the target form field;
in response to selecting a first RPA strategy from the plurality of alternative RPA strategies according to the ranking, perform a first attempt to fill in the selected form field according to the first RPA strategy;
in response to determining that the first attempt failed, select a second RPA strategy from the plurality of alternative RPA strategies according to the ranking;
in response to selecting the second RPA strategy, perform a second attempt to fill in the selected form field according to the second RPA strategy; and
in response to determining that the second attempt was successful, cause an update of the strategy ranking indicator within the database, the update configured to change the ranking so that a selection of the second RPA strategy is prioritized over a selection of the first RPA strategy.

2. The method of claim 1, wherein the at least one hardware processor is configured to determine an order in which each of the plurality of alternative RPA strategies is selected for use according to the ranking.

3. The method of claim 1, wherein the ranking indicates a likelihood that each respective RPA strategy will be successful in filling in the target form field.

4. The method of claim 1, wherein the strategy ranking indicator comprises an ordered sequence of strategy identifiers, each strategy identifier identifying a distinct RPA strategy of the plurality of alternative RPA strategies, and wherein the ranking is determined according to a position of each respective strategy identifier within the ordered sequence.

5. The method of claim 4, wherein updating the strategy ranking indicator comprises rearranging the ordered sequence of strategy identifiers.

6. The method of claim 1, wherein the target UI comprises a browser interface displaying a target web page, and wherein the identifier of the target UI comprises a uniform record identifier (URI) of the target web page.

7. The method of claim 1, wherein the database associates the strategy ranking indicator with the identifier of the target UI.

8. The method of claim 1, comprising selectively retrieving the strategy ranking indicator from the database further according to a field ID identifying the target form field among a plurality of form fields displayed by the target UI.

9. The method of claim 8, wherein the field ID comprises a text label displayed in a proximity of the target form field.

10. The method of claim 1, further comprising, in response to selecting the first RPA strategy, employing the at least one hardware processor to selectively retrieve a strategy package from a remote repository, the strategy package comprising a specification of the first RPA package.

11. A computer system comprising at least one hardware processor configured to optimize a robotic process automation (RPA) procedure of filling in a target form field displayed by a target user interface (UI), wherein optimizing the RPA procedure comprises employing the at least one hardware processor to:
retrieve a strategy ranking indicator from a database according to an identifier of the target UI, wherein the strategy ranking indicator identifies a plurality of alternative RPA strategies for filling in the target form field and further indicates a ranking among the plurality of alternative RPA strategies, and wherein each of the plurality of alternative RPA strategies comprises a distinct sequence of RPA activities configured to fill in the target form field;
in response to selecting a first RPA strategy from the plurality of alternative RPA strategies according to the ranking, perform a first attempt to fill in the selected form field according to the first RPA strategy;
in response to determining that the first attempt failed, select a second RPA strategy from the plurality of alternative RPA strategies according to the ranking;
in response to selecting the second RPA strategy, perform a second attempt to fill in the selected form field according to the second RPA strategy; and
in response to determining that the second attempt was successful, cause an update of the strategy ranking indicator within the database, the update configured to change the ranking so that a selection of the second RPA strategy is prioritized over a selection of the first RPA strategy.

12. The computer system of claim 11, wherein the at least one hardware processor is configured to determine an order in which each of the plurality of alternative RPA strategies is selected for use according to the ranking.

13. The computer system of claim 1, wherein the ranking indicates a likelihood that each respective RPA strategy will be successful in filling in the target form field.

14. The computer system of claim 11, wherein the strategy ranking indicator comprises an ordered sequence of strategy identifiers, each strategy identifier identifying a distinct RPA strategy of the plurality of alternative RPA strategies, and wherein the ranking is determined according to a position of each respective strategy identifier within the ordered sequence.

15. The computer system of claim 14, wherein updating the strategy ranking indicator comprises rearranging the ordered sequence of strategy identifiers.

16. The computer system of claim 11, wherein the target UI comprises a browser interface displaying a target web page, and wherein the identifier of the target UI comprises a uniform record identifier (URI) of the target web page.

17. The computer system of claim 11, wherein the database associates the strategy ranking indicator with the identifier of the target UI.

18. The computer system of claim 11, wherein the at least one hardware processor is configured to selectively retrieve the strategy ranking indicator from the database further according to a field ID identifying the target form field among a plurality of form fields displayed by the target UI.

19. The computer system of claim 18, wherein the field ID comprises a text label displayed in a proximity of the target form field.

20. The computer system of claim 11, wherein the at least one hardware processor is further configured to, in response to selecting the first RPA strategy, selectively retrieve a strategy package from a remote repository, the strategy package comprising a specification of the first RPA package.

21. A non-transitory computer-readable medium storing instructions which, when executed by at least one hardware processor of a computer system, cause the computer system to optimize a robotic process automation (RPA) procedure of filling in a target form field displayed by a target user interface (UI), wherein optimizing the RPA procedure comprises employing the at least one hardware processor to:

retrieve a strategy ranking indicator from a database according to an identifier of the target UI, wherein the strategy ranking indicator identifies a plurality of alternative RPA strategies for filling in the target form field and further indicates a ranking among the plurality of alternative RPA strategies, and wherein each of the plurality of alternative RPA strategies comprises a distinct sequence of RPA activities configured to fill in the target form field;

in response to selecting a first RPA strategy from the plurality of alternative RPA strategies according to the ranking, perform a first attempt to fill in the selected form field according to the first RPA strategy;

in response to determining that the first attempt failed, select a second RPA strategy from the plurality of alternative RPA strategies according to the ranking;

in response to selecting the second RPA strategy, perform a second attempt to fill in the selected form field according to the second RPA strategy; and in response to determining that the second attempt was successful, cause an update of the strategy ranking indicator within the database, the update configured to change the ranking so that a selection of the second RPA strategy is prioritized over a selection of the first RPA strategy.

\* \* \* \* \*